Oct. 12, 1937.  H. D. BOLTON  2,095,486

THERMOMETER

Filed April 15, 1937

INVENTOR.
HARRY D. BOLTON
BY
D. Clyde Jones
ATTORNEY.

Patented Oct. 12, 1937

2,095,486

UNITED STATES PATENT OFFICE 2,095,486

THERMOMETER

Harry D. Bolton, Rochester, N. Y., assignor to Taylor Instrument Companies, Rochester, N. Y., a corporation of New York Application April 15, 1937, Serial No. 137,093

3 Claims. (Cl. 73—52)

This invention relates to thermometers and particularly to thermometers of the type adapted to be mounted on a wall.

An object of the invention is to provide a simple, reliable, concealed hanger for a thermometer of this type.

Figure 1:
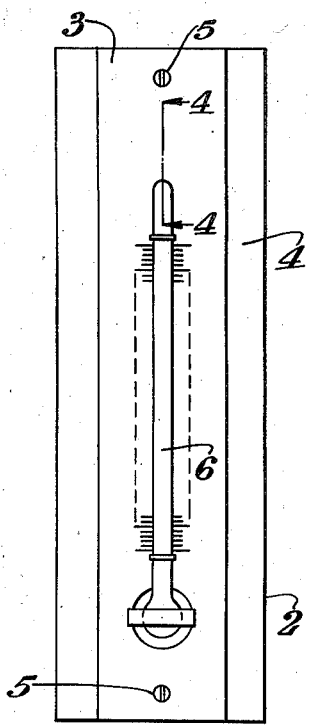
Figure 2:
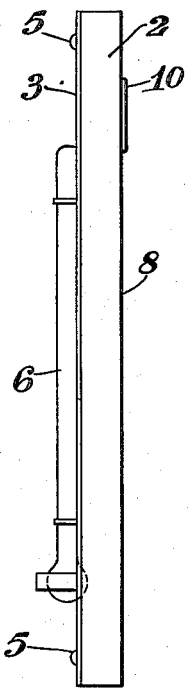
Figure 3:
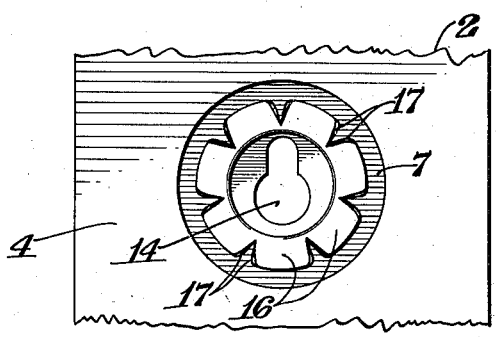
Figure 4:
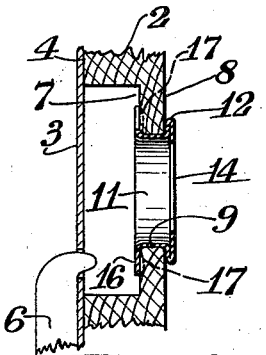
Figure 5:
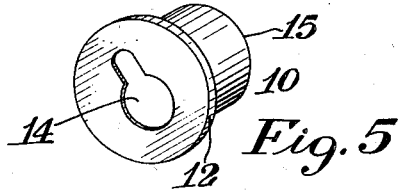

In the drawing Fig. 1 is a front face view of a thermometer of the present invention; Fig. 2 is an edge view of the thermometer illustrated in Fig. 1; Fig. 3 is an enlarged fragmentary front view of the thermometer back with the thermometer scale and tube omitted; Fig. 4 is an enlarged section taken on line 4—4 of Fig. 1; and Fig. 5 is a perspective view of the hanger prior to its mounting in a thermometer.

The thermometer 1 comprises a back 2, a graduated scale plate 3 which is secured to the front face 4 of the back by means of screws 5 or other suitable fastening means, and a thermometer tube 6 secured in fixed relation to the scale plate. The upper end portion of the front of the back 2 is provided with a recess 7 which communicates with a hole 9 extending through the back to the rear face thereof. The recess 7 and hole 9 are adapted to receive the hanger 10. This hanger prior to its insertion in the hole 9 consists of a one-piece sleeve-like portion 11 (Fig. 5), the external diameter of which is preferably such that it snugly fits the hole 9. The outer end of the sleeve, that is, the end which abuts the rear face of the back is formed as shown in section of Fig. 4 to provide an outwardly extending flange 12 of larger diameter than that of the hole 9 and adapted to overlie the rear face of the thermometer back. This last-mentioned end of the sleeve is closed except for the keyhole slot or opening 14 therein.

In assembling the thermometer, the sleeve 10 is inserted into the hole 9 in the back with the inner end 15 (Fig. 5) projecting into the recess 7. By means of a suitable tool, the projecting end 15 is upset to form the outwardly extending flange portions 16 engaging the bottom wall of the recess 7. By this forming operation the projecting end 15 is pressed into the shape shown in Fig. 3 with portions 17 thereof slightly embedded into the thermometer back to prevent rotation of the hanger relative to the back. Thereafter the thermometer tube 6 is secured to the scale plate which, in turn, is fastened on the front face of the thermometer back. Thus the recess 7 in the back 2, as well as the upset portions 16 of the hanger, are concealed by the thermometer scale when the thermometer is in its finally assembled condition.

It will be understood that the keyhole slot 14 in the end of the hanger is adapted to receive a short, headed nail or the like mounted on a wall, so that the thermometer can be easily applied to or removed from the wall.

From the above it will be seen that the invention provides a simple inexpensive but secure hanger for a thermometer, the hanger being concealed while the thermometer is supported on a wall or the like.

I claim:

1. In combination, a thermometer back, a scale plate mounted on one face of said back, a thermometer tube superimposed on said scale plate, said back having an opening therethrough near to its upper end and in a position to be concealed by said scale plate, a sleeve disposed in said opening and having flanges respectively engaging opposing faces of said thermometer back adjacent said opening, the end of said sleeve remote from said plate being closed except for a reduced aperture therein.

2. In combination, a thermometer back having a rear face and a front face, said front face being adapted to have a thermometer tube and scale plate mounted thereon, said back having an opening therethrough at the rear of said scale plate, a sleeve disposed in said opening and having flanges at each end thereof engaging the respective faces of said back for anchoring said sleeve in said opening, and means carried by the flange at said rear face adapted to engage a fixed support.

3. In combination, a thermometer back, a graduated scale plate mounted on the front face of said back, a thermometer tube superimposed on said scale plate, said back having a recess in the front face thereof at the rear of said plate and having a hole therethrough opening into said recess, a sleeve disposed in said hole, one end of said sleeve being upset to overlie and be partially embedded in the bottom wall of said recess, the other end of said sleeve having an outwardly projecting flange to engage the rear face of the back whereby the back is clamped between said flanges, the last mentioned end of said sleeve being closed except for a keyhole opening therein.

HARRY D. BOLTON.